(12) United States Patent
Nishimura

(10) Patent No.: US 6,384,572 B1
(45) Date of Patent: May 7, 2002

(54) PORTABLE ELECTRONIC APPARATUS

(75) Inventor: Yoshihiko Nishimura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/583,910

(22) Filed: May 31, 2000

(30) Foreign Application Priority Data

Jun. 1, 1999 (JP) ............................................. 11-154413

(51) Int. Cl.[7] ................................................. H02J 7/00
(52) U.S. Cl. ...................................... 320/106; 320/132
(58) Field of Search ................................. 320/132, 149, 320/106, 112, 134, 136

(56) References Cited

U.S. PATENT DOCUMENTS

| | | | |
|---|---|---|---|
| 4,965,738 A | * 10/1990 | Bauer et al. ................ | 320/136 |
| 5,600,230 A | * 2/1997 | Dunstan ..................... | 340/636 |
| 5,686,809 A | * 11/1997 | Kimura et al. .............. | 320/101 |
| 6,025,695 A | * 2/2000 | Fried et al. ................. | 320/106 |
| 6,154,004 A | * 11/2000 | Huguchi ..................... | 320/106 |
| 6,163,132 A | * 12/2000 | Higuchi et al. ............. | 320/132 |
| 6,174,617 B1 | * 1/2001 | Hiratsuka et al. ........... | 429/90 |

* cited by examiner

*Primary Examiner*—Gregory Toatley
(74) *Attorney, Agent, or Firm*—Ronald P. Kananen, Esq.; Rader, Fishman & Grauer, PLLC

(57) ABSTRACT

A control unit of a portable electronic apparatus includes a secondary battery cell or a battery, a control unit in which information about the electric power characteristics of the secondary battery or the battery has been stored, a loading unit into which plural types of batteries which produce the same output voltage and incorporating output terminals having the same shape are loaded, a communication unit for receiving information about the electric power characteristics from the battery; and a control unit incorporating a storage portion in which information about a plurality of operations corresponding to information about the electric power characteristics is stored and arranged to read information about the operation from the storage portion in accordance with information about the electric power characteristics communicated from the control unit of the battery pack to control a plurality of operations of an apparatus body.

11 Claims, 12 Drawing Sheets

PORTABLE ELECTRONIC APPARATUS

BRIEF DESCRIPTION OF THE INVENTION

This invention relates to a portable electronic apparatus, and more particularly to a control unit relating power characteristics of a battery to control the operating of the electronic apparatus.

DESCRIPTION OF THE RELATED ART

A video camera apparatus is known that incorporates a body and a battery pack which is detachable with respect to the body. The battery pack incorporates a battery cell constituted by a secondary battery, such as a lithium-ion battery, a NiCd battery or a nickel-hydrogen battery. A major portion of the video camera apparatuses each incorporating a battery pack of the foregoing type is able to also use an AC/DC power source. The video camera apparatus is arranged such that the load control conditions in a case where the battery pack is used and those in a case where the AC/DC power source is used are made to be different. When the battery pack is used as the power source, an allowable load electric power is usually limited. Therefore, use of the video camera apparatus in a state where a large load electric power is exerted is inhibited.

An attempt has been made to enlarge the capacity of the battery pack. A portion of the battery packs has a structure wherein the number of battery cells, that incorporate output terminals formed into the same shape, arranged to output the same voltage and connected in parallel, is increased to increase the allowable load electric power. A portion of the video camera apparatus is arranged to permit loading of a variety of battery packs having different allowable load electric power into the body of the video camera apparatus.

The video camera apparatus, structured such that plural types of the battery packs having different allowable load electric power are loaded into the body of the video camera is arranged such that the load control conditions are made to be different between a case where the battery pack is used and the case where the AC/DC power source is used. Any control of the load which is exerted on the power source has not been applied between battery packs having different allowable load electric power.

When an excessively large number of functions of the video camera apparatus are provided by the video camera apparatus when a battery pack having a small allowable load electric power has been loaded into the body of the video camera apparatus, an excess current flows in the battery pack. As a result, the load is increased excessively. Therefore, when a video camera apparatus of the foregoing is designed, adaptation to the battery pack having the smallest allowable load electric power among the battery packs which can be loaded into the body of the video camera apparatus is required. Therefore, the design of the video camera apparatus has been limited. In addition, in a case where a battery pack having allowable load electric power is loaded, the function of the video camera is undesirably limited.

SUMMARY OF THE INVENTION

Accordingly, an object of the present invention is to provide a portable electronic apparatus arranged to identify the electric power characteristics of a battery loaded into the body of the apparatus to permit functions corresponding to the battery to be performed.

To achieve the foregoing object, according to one aspect of the present invention, there is provided a portable electronic apparatus comprising: a secondary battery cell or a battery; control means having electric characteristic information about the secondary battery or the battery stored therein; loading means into which a plurality of types of batteries having substantially the same output voltage and shape of output terminals are loaded; communication means for receiving electric power characteristic information obtained from the battery; control means incorporating a storage portion in which a plurality of operation information items corresponding to electric power characteristic information are stored and arranged to read operation information supplied from the storage portion in accordance with electric power characteristic information supplied from the control means for the battery pack so as to control the operation of the apparatus body. That is, the portable electronic apparatus permits a plurality of batteries having different electric power characteristics to be loaded. Since the control means for the battery reads electric power characteristic information, the type of the loaded battery can be identified and the operation of the body of the apparatus is thus limited.

The control means obtains internal connection information of the secondary battery cell or the battery included in the battery in accordance with electric power characteristic information so as to control the operation of the body of the apparatus in accordance with internal connection information.

The control means identifies the number of secondary battery cells or batteries included in the battery and connected in parallel in accordance with electric power characteristic information to control the functions of the body of the apparatus in accordance with a result of identification.

DETAILED DESCRIPTION OF PREFERRED EMBODIMENTS

A video camera apparatus 1 to which a portable electronic apparatus according to the present invention is applied will now be described with reference to the drawings.

Figure 1:
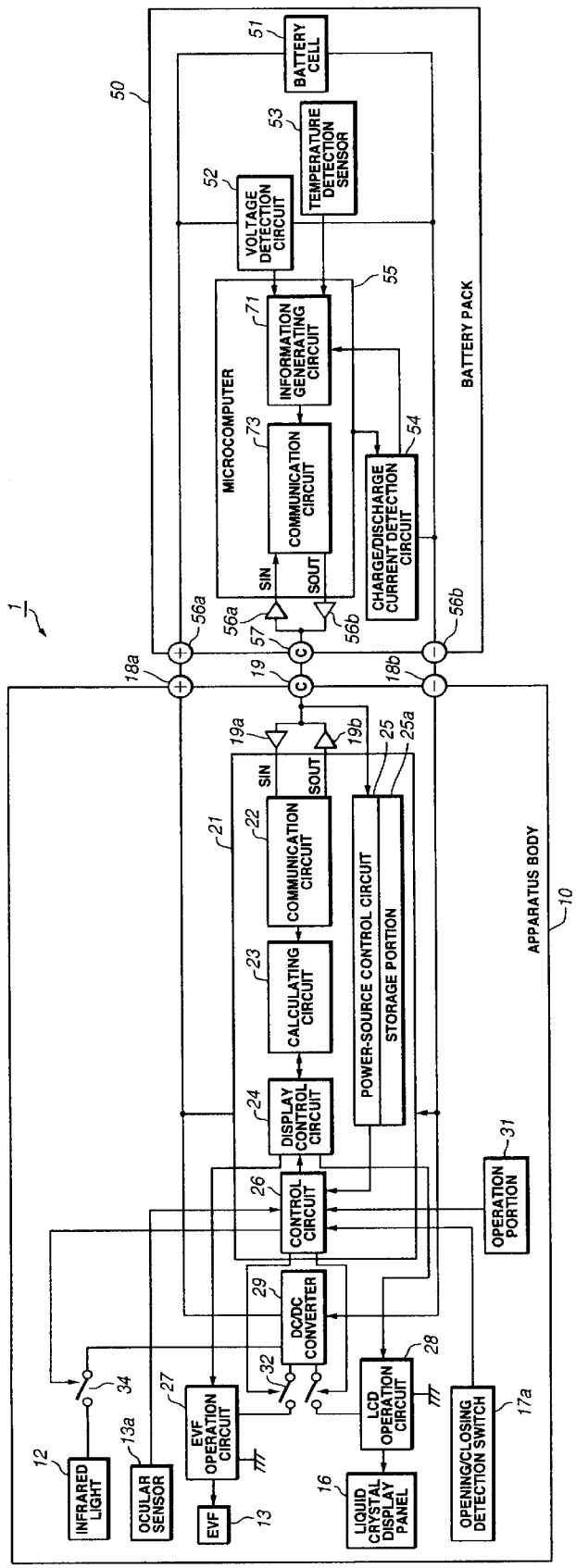
FIG. 1 is a block diagram showing a video camera apparatus according to the present invention.
Figure 2:
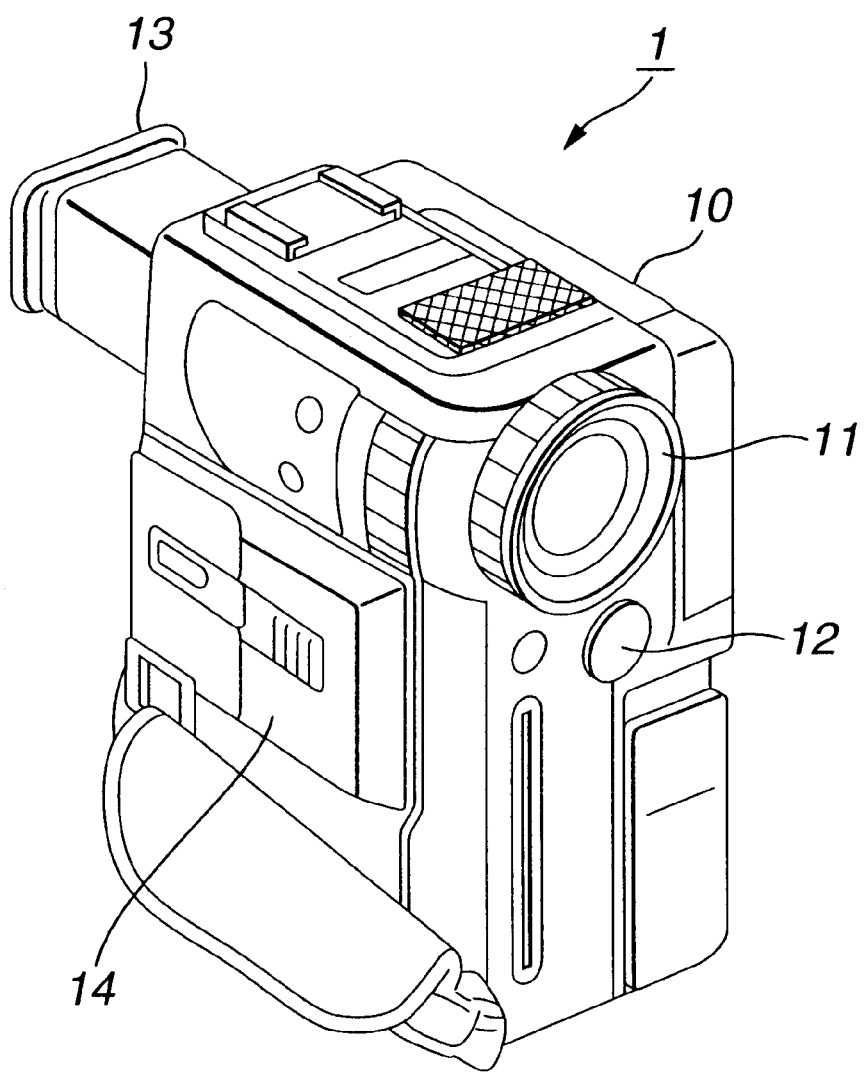
FIG. 2 is a perspective view showing the shape of the video camera apparatus when the video camera apparatus is viewed from the front surface.
Figure 3:
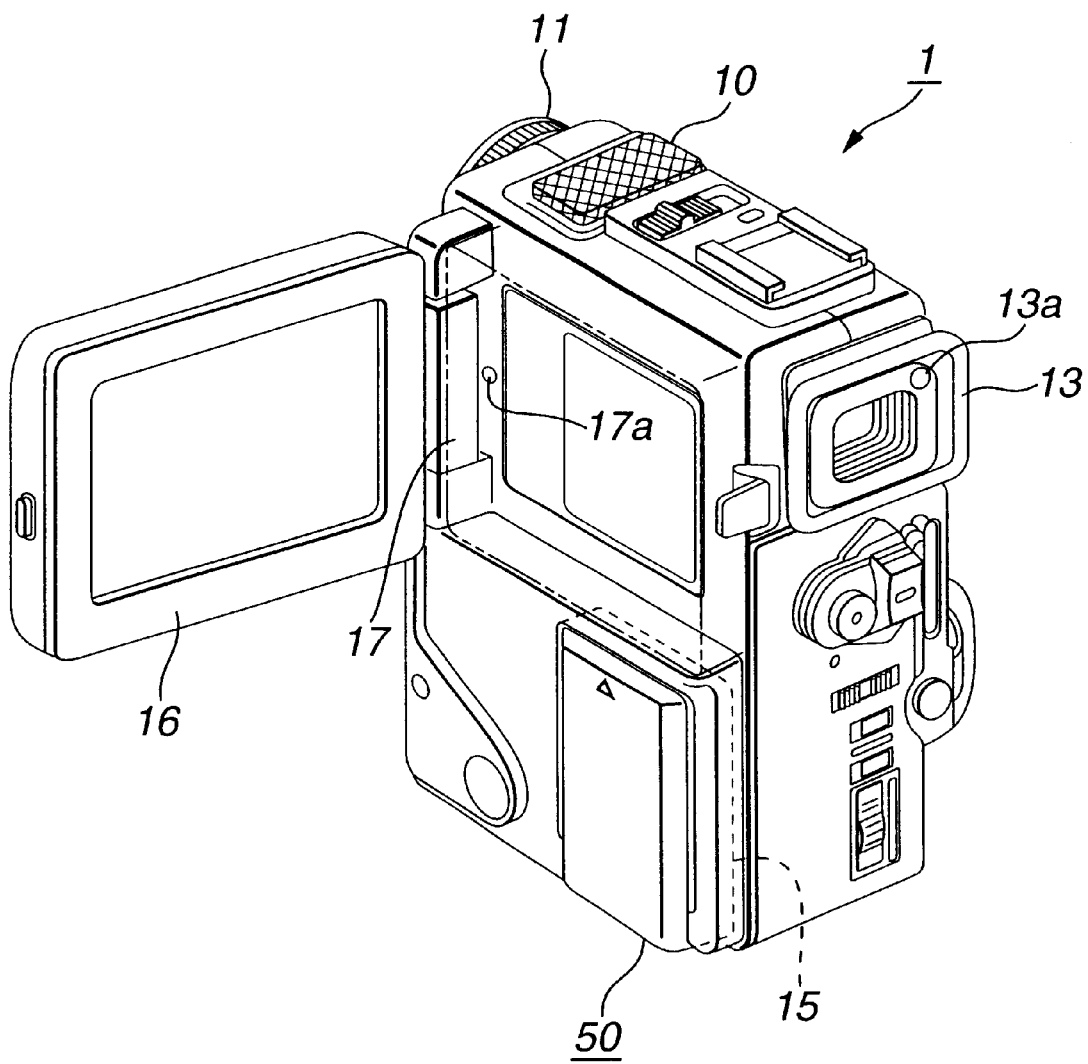
FIG. 3 is a rear perspective view of the video camera apparatus when the video camera apparatus is viewed from a rear portion in a state where a liquid crystal display panel is opened.

As shown in FIGS. 1 to 3, the video camera apparatus 1 incorporates an apparatus body 10 for photographing a subject and a battery pack 50 for supplying electric power to the apparatus body 10. The apparatus body 10 is formed into a substantially elongated shape having a portable size. The apparatus body 10 is provided with an image pickup portion 11 on the front surface thereof, the image pickup portion 11 incorporating a CCD device for photographing a subject.

The apparatus body 10 has the front surface provided with an infrared light 12, (disposed adjacent to the image pickup portion 11), for permitting the subject to be photographed even in a dark environment. The apparatus body 10 has a rear surface opposite to the front surface provided with the image pickup portion 11, the rear surface having a view finder 13 serving as a first display means. When the user views the view finder 13, the subject being photographed can be viewed.

A recording-medium accommodating portion 14 into which a tape cassette, incorporating a magnetic tape serving as a recording medium or a disc recording medium serving as the recording medium is loaded, is provided for either side surface of the apparatus body 10. A battery loading portion 15 into which a battery pack serving as a power source for the apparatus body 10 is detachably loaded is provided for another side surface of the apparatus body 10 at a position adjacent to the bottom of the apparatus body 10. The battery loading portion 15 incorporates a positive battery terminal 18a and a negative battery terminal 18b for supplying electric power from the battery pack 50 to the apparatus body 10. Moreover, a communication terminal 19 for establishing the communication with the battery pack 50 is provided for the battery loading portion 15.

A liquid crystal display panel 16, serving as a second display means on which the subject is being photographed is displayed together with the view finder 13, is provided for an upper portion of the other side surface of the apparatus body 10. The liquid crystal display panel 16 is supported by the other side surface of the apparatus body 10 through a hinge portion 17 such that the liquid crystal display panel 16 is rotated from an opened state shown in FIG. 3 and a closed state shown in FIG. 2. When a photographer is using the view finder 13, the liquid crystal display panel 16 is brought to the closed state. When an attempt is made to permit another person except for the photographer to view the contents which are being photographed, the liquid crystal display panel 16 is opened. Specifically, the view finder 13 and the liquid crystal display panel 16 are switched among a first mode in which only the view finder 13 is used, a second mode in which only the liquid crystal display panel 16 is used, and a third mode in which both the view finder 13 and the liquid crystal display panel 16 are used.

The battery pack 50 which is loaded into the battery loading portion 15 includes a charge type battery cell, such as a lithium-ion battery. The battery pack 50 incorporates a positive terminal 56a and a negative terminal 56b for supplying electric power to the apparatus body 10 and a communication terminal 57 for establishing communication with the apparatus body 10. To enable the battery cell to be connected to the positive and negative battery terminals 1 8a and 18b and the communication terminal 19 of the apparatus body 10, the battery pack 50 consists of a plurality of types of battery cells having the same shapes of the positive terminal 56a and the negative terminal 56b and the communication terminal 57. Moreover, the plural battery cells are arranged to output the same voltage and have different allowable load electric power. That is, the allowable load electric power is increased as the number of the battery cells connected in parallel is increased. The allowable load electric power is reduced as the number of the battery cells connected in parallel is reduced. In this embodiment, two types of battery packs having different allowable load electric power are employed. The video camera apparatus 1 structured as described above is used in a state where the battery pack 50 has been loaded into the battery loading portion 15.

As described above, the video camera apparatus 1 incorporates the apparatus body 10 and the battery pack 50. As shown in FIG. 3, the apparatus body 10 includes microcomputer 21 which produces information about the residual amount of the battery power of the battery pack 50 and detects the type of the battery pack 50 to limit the function of the video camera apparatus 1.

The battery loading portion 15 of the apparatus body 10 (best seen in FIG. 3) is provided with a positive battery terminal 18a to which a positive terminal of the battery pack 50 is connected when the battery pack 50 has been loaded into the battery loading portion 15; and a negative battery terminal 18b to which a negative terminal of the battery pack 50 is connected. The positive battery terminal 18a and the positive terminal of the battery pack 50 are connected to the apparatus body 10. Moreover, the negative terminal of the battery pack 50 is connected to the negative battery terminal 18b. Thus, electric power is supplied to the apparatus body 10.

The battery loading portion 15 of the apparatus body 10 is provided with the communication terminal 19 for establishing the communication with the battery pack 50. The communication terminal 19 is connected to a communication terminal of the battery pack 50. When the battery pack 50 has been loaded into the apparatus body 10, the apparatus body 10 transmits, to the battery pack 50, a requirement signal for requiring information about the battery pack 50. The requirement signal is amplified by a buffer amplifier 19a through the communication terminal 19. In response to the requirement communicated from the apparatus body 10, the battery pack 50 transmits, to the apparatus body 10, a signal concerning the battery pack 50, the signal being amplified by a buffer amplifier 19b.

A microcomputer 21 included in the apparatus body 10 incorporates a communication circuit 22 for receiving information about the battery cell supplied from the battery pack 50; a calculating circuit 23 for producing information about the residual amount in the battery pack 50 in accordance with information received by the communication circuit 22 and concerning the battery pack 50; and a display control circuit 24 for producing a display signal in accordance with information about the residual amount produced by the calculating circuit 23.

When the battery pack 50 has been loaded into the battery loading portion 15, the communication terminal of the battery pack 50 is connected to the communication terminal 19 provided for the battery loading portion 15. Thus, battery information about the battery pack 50 is supplied. The battery information above is, through the control circuit 26 and the communication circuit 22, supplied to the calculating circuit 23 which constitutes the microcomputer 21.

The calculating circuit 23 is supplied with information about the residual amount of integrated discharge current obtained by multiplying the discharge electric current of the battery pack with the discharge duration and constituting battery information and temperature information indicating the temperatures of the battery cells disposed in the battery pack 50. The calculating circuit 23 is also provided with previously-stored information about a power consumption which takes place when the view finder 13 is operated, information about a second power consumption which takes place when the liquid crystal display panel 16 is used and information about a third power consumption which takes place when both of the view finder 13 and the liquid crystal display panel 16 are used.

Figure 4:
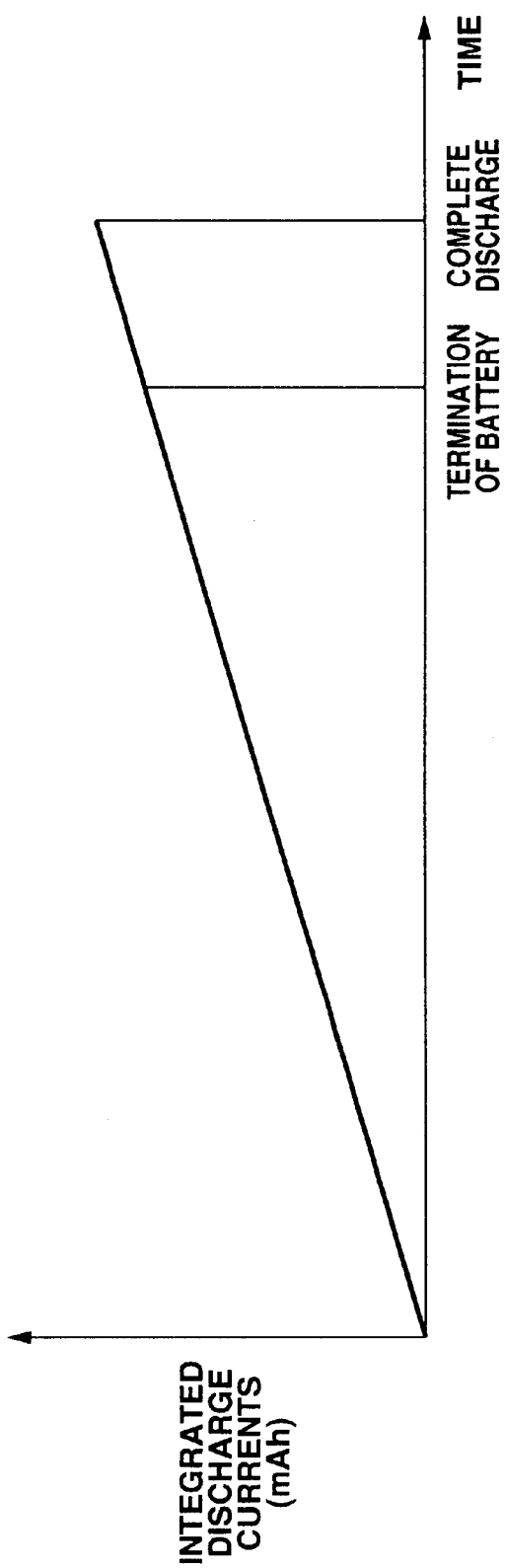
FIG. 4 is a graph showing the relationship between integrated discharge currents of the battery and time.

When the battery pack 50 is discharged with a predetermined power consumption, the amount of integration of the discharge currents with respect to the discharge duration is substantially proportional with the discharge duration, as shown in FIG. 4. When a lowest voltage (a termination voltage of the battery) with which the video camera apparatus 1 can be operated is determined, the point of the termination voltage of the voltage shown in FIG. 4 is positioned between the start of discharge and complete discharge (i.e., a state where the battery cell 51 has no energy therein).

Figure 5:
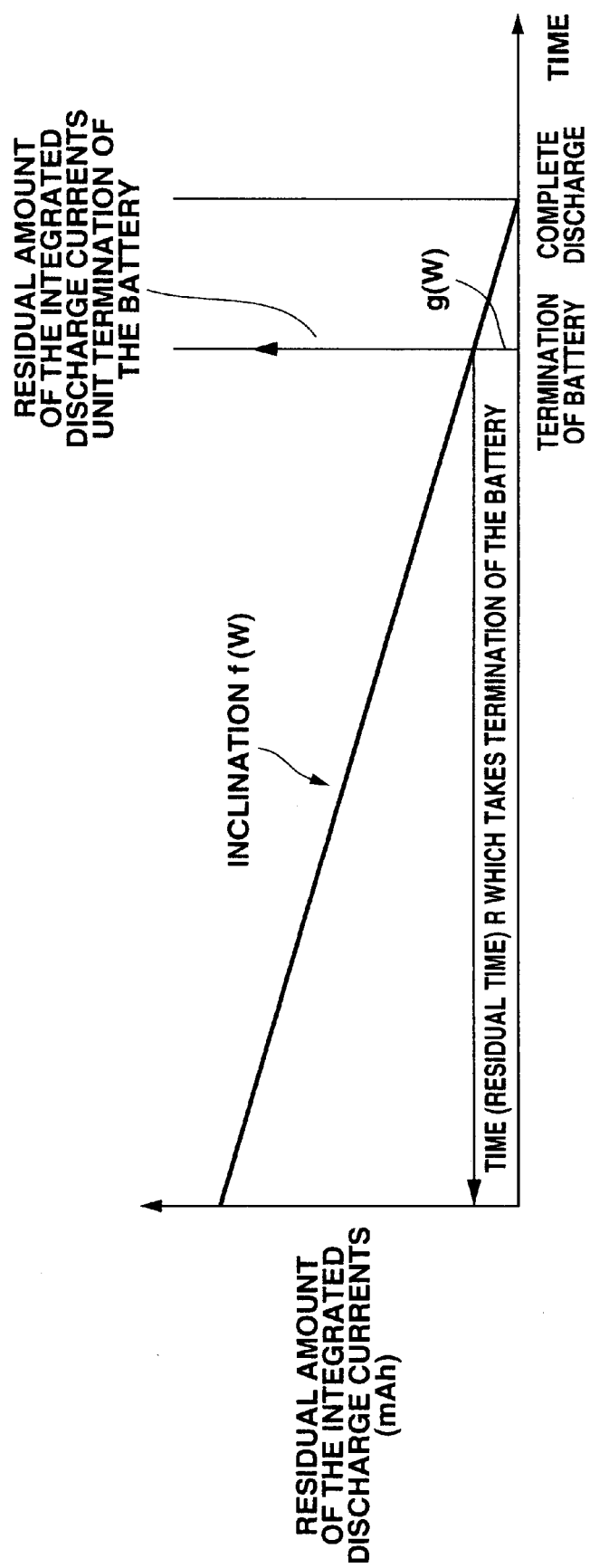
FIG. 5 is a graph showing the relationship between the residual amount of integrated discharge currents of the battery and time in a first mode in which only the view finder is used.
Figure 6:
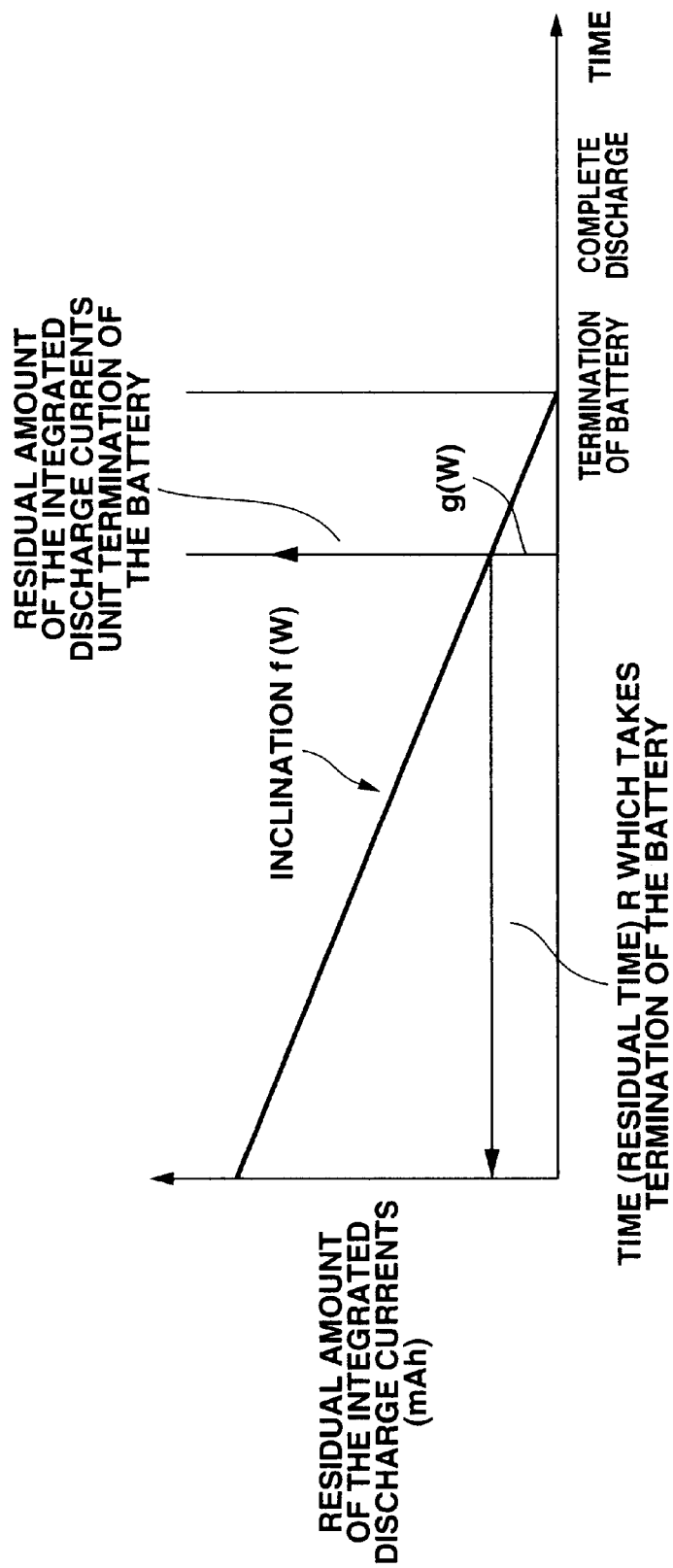
FIG. 6 is a graph showing the relationship between the residual amount of integrated discharge currents of the battery and time in a second mode in which only the liquid crystal display panel is used.
Figure 7:
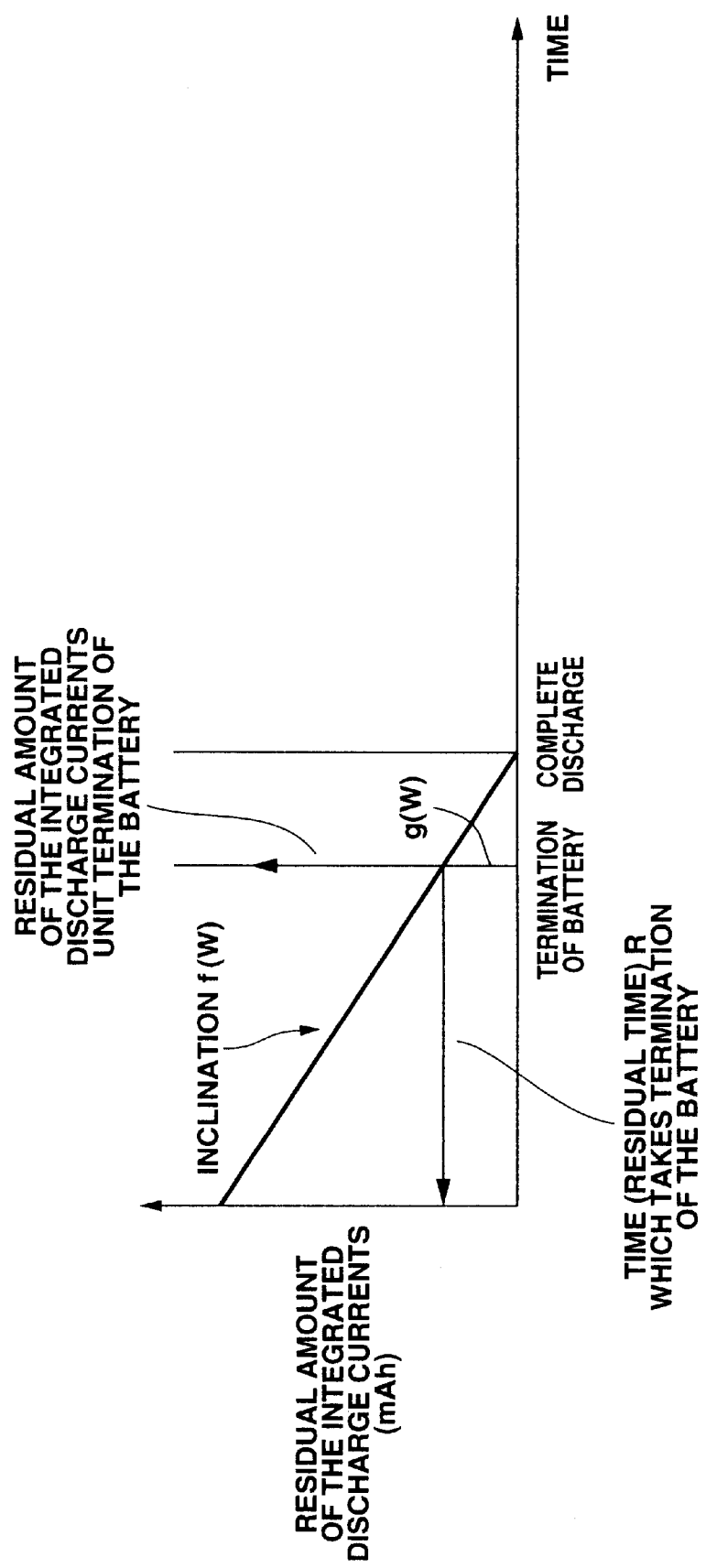
FIG. 7 is a graph showing the relationship between the residual amount of integrated discharge currents of the battery and time in a third mode in which both of the view finder and the liquid crystal display panel are used.

As shown in FIGS. 5 to 7, the residual amount of the integrated discharge currents with respect to the discharge duration and which is realized until the complete discharge is performed will now be described. When the axes of the coordinates are drawn such that an assumption is made that the termination of the battery is the origin, the axis of the ordinate stands for the residual amount of the integrated discharge currents available until the termination of the battery. On the other hand, the axis of the abscissa stands for the residual time permitted to the termination of the battery. Therefore, when the residual amount of the integrated discharge currents is detected, the residual time permitted for the battery can be calculated.

FIG. 5 is a graph showing the discharge characteristic realized when the view finder 13 is used. FIG. 6 is a graph showing the discharge characteristic realized when the liquid crystal display panel 16 is used. FIG. 7 is a graph showing the discharge characteristic realized when both of the view finder 13 and the liquid crystal display panel 16 are used. The power consumption of the apparatus body 10 is increased when only the liquid crystal display panel 16 is used as compared with a case where only the view finder 13 is used. The power consumption is increased when both of the view finder 13 and the liquid crystal display panel 16 are used as compared with a case where the liquid crystal display panel 16 is used. Therefore, as shown in FIGS. 5 to 7, when the power consumption is increased, the inclination becomes steeper. The ratio of the residual time with respect to the residual amount of the integrated discharge currents is raised. Also the residual amount of the integrated discharge currents realized from termination of the battery to the complete discharge is changed in a case where the power consumption is large because of the influence of the internal impedance of the battery pack 50.

The foregoing fact is expressed by the following equation (1):

$$R = Qd\ f(W1\ to\ W3) = (Q - g(W1\ to\ W3)f(W1\ to\ W3) \tag{1}$$

where R in equation (1) indicates a time (residual time) required to termination of the battery, Qd indicates the residual amount of the integrated discharge currents required to the termination of the battery, W1 to W3 indicate the power consumption (fixed values) of the video camera apparatus 1, f (W1 to W3) indicate fixed values which are electric power dependency coefficient, Q indicates the residual amount of the integrated discharge currents, g (W1 to W3) indicate fixed values which are residual amounts at the time of the termination of the battery, W1 indicates the power consumption (a fixed value) in the first mode in which the view finder 13 is used, W2 indicates the power consumption (a fixed value) in the second mode in which only the liquid crystal display panel 16 is used and W3 indicates power consumption (a fixed value) in the third mode in which both of the view finder 13 and the liquid crystal display panel 16 are used.

When the residual time R required to the termination of the battery shown in equation (1) is calculated a, change in the temperature of the battery cell included in the battery pack 50 is considered, and the following equation (2) is obtained:

$$R = Qd\ f(W1\ to\ W3)h1(T) = (Q - g(W1\ to\ W3)h2(T))f(W1\ to\ W3)h1(T) \tag{2}$$

where T in equation (2) indicates the temperature of the battery cell and h1 (T) and h2 (T) indicate temperature dependency coefficients of the battery cell. The residual amount of the integrated discharge currents Q and the temperature dependency coefficients h1 (T) and h2 (T) are transmitted from the battery pack 50. The values of (W1 to W3) and g (W1 to W3) are previously stored in the calculating circuit 23. As seen in equation (2), f (W1 to W3) and h (W1 to W3) are multiplied with the temperature dependency coefficients h1 (T) and h2 (T).

When the residual time produced in the calculating circuit 23 and taken to the termination of the battery has been communicated to the display control circuit 24, the display control circuit 24 produces display information about the residual amount in the battery to be displayed on the view finder 13 and/or the liquid crystal display panel 16 as shown in FIG. 1 in accordance with the residual time R taken to the termination of the battery, that is, a battery residual quantity signal.

As shown in FIG. 1, the microcomputer 21 incorporates a power-source control circuit 25 to which information about the allowable load electric power, which is the information about the battery pack 50 loaded into the battery loading portion 15, is supplied together with the foregoing residual amount of the integrated discharge currents. The power-source control circuit 25 is supplied with information about the allowable load electric power to correspond to the type of the battery pack 50 loaded into the battery loading portion 15. The power-source control circuit 25 incorporates a storage portion 25a having first operation information about the usual mode in which all of the functions of the apparatus body 10 can be used and first operation information about a function limited mode in which the functions of the apparatus body 10 are limited.

In the usual mode, the infrared light 12, the liquid crystal display panel 16 and the like can simultaneously be used. That is, the usual mode is a mode in which the functions of the apparatus body 10 are not limited. The function limited mode is a mode in the functions of the apparatus body 10 are forcibly limited such that use of the infrared light 12 which enables a subject in a dark environment to be photographed, use of the view finder 13 and that of the liquid crystal display panel 16 is selectively inhibited. The function limited mode with which the functions of the apparatus body 10 are limited reduces the power consumption of the apparatus body 10. When the battery pack 50 having a small allowable load electric power has been loaded into the battery loading portion 15, the load of the battery pack 50 is reduced in the function limited mode.

The power-source control circuit 25 selects the usual mode in which all of the functions of the apparatus body 10 can be used where the battery pack 50 having a large allowable load electric power has been loaded into the battery loading portion 15. In a case where the battery pack 50 having a small allowable load electric power has been loaded, the power-source control circuit 25 selects the function limited mode in which the power consumption is reduced and the functions of the apparatus body 10 are limited. The power-source control circuit 25 supplies first operation information or second operation information indicating whether the mode is the usual mode or the function limited mode to the control circuit 26 which switches the operation of the view finder 13, the liquid crystal display panel 16 and the infrared light 12.

The control circuit 26 constituting the microcomputer 21 is supplied with identification information whether or not the photographer is using the view finder 13 from an ocular sensor 13a provided for a portion of the view finder 13 adjacent to the eye of the photographer and arranged to identify whether or not the view finder 13 is being used by the photographer. The ocular sensor 13a is a depression switch arranged to be switched on when the eye of the photographer has been brought into contact with the view finder 13 and the depressive member has been depressed. Thus, identification information indicating a fact that the photographer is using the view finder 13 is supplied to the control circuit 26 from the ocular sensor 13a. When the eye of the photographer is not in contact with the view finder 13, the depressive member is turned off. Thus, identification information indicating a fact that the photographer is not using the view finder 13 is supplied to the control circuit 26. The control circuit 26 controls the operation of a switch 32 for switching between the supply of electric power and interruption of the supply of electric power to the operation circuit 27 of the view finder 13.

The control circuit 26 is supplied with identification information indicating whether or not the photographer has opened the liquid crystal display panel 16 and uses the same from an opening/closing detection switch 17a provided for the hinge portion 17 for supporting the liquid crystal display panel 16. The opening/closing detection switch 17a is, for example, a depression switch which is switched on when the liquid crystal display panel 16 is opened by the photographer. Thus, identification information indicating a fact that the photographer is using the liquid crystal display panel 16 is supplied to the control circuit 26. When the liquid crystal display panel 16 has been closed by the photographer and the photographer is not using the liquid crystal display panel 16, the opening/closing detection switch 17a is switched off. Thus, identification information indicating a fact that the photographer is not using the liquid crystal display panel 16 is supplied to the control circuit 26. The control circuit 26 controls the operation of a switch 33 for switching between supplying of electric power and interruption of supply of electric power to the operation circuit 28 of the liquid crystal display panel 16.

The control circuit 26 is supplied with an operation signal for operating the infrared light 12 from the operation portion 31 arranged to input an instruction to turn on/off the infrared light 12 and constituted by, for example, a depression button. When the operation signal for operating the infrared light 12 has been supplied to the control circuit 26, the control circuit 26 controls the operation of a switch 34 which switches supply of electric power/interruption of electric power to the infrared light 12.

The apparatus body 10 incorporating the microcomputer 21 is provided with an operation circuit 27 for operating the view finder 13, an operation circuit 28 for operating the liquid crystal display panel 16 and a DC/DC converter 29 for supplying electric power to the operation circuit 28 of the view finder 13 and the operation circuit 28 of the liquid crystal display panel 16.

The DC/DC converter 29 is connected to positive and negative battery terminals 18a and 18b provided for the battery loading portion 15. Thus, electric power is supplied from the battery pack 50 to the DC/DC converter 29. The DC/DC converter 29 is connected to the switch 32 connected to the operation circuit 28 of the liquid crystal display panel 16 and arranged to switch the operation of the operation circuit 27. When the switch 32, the operation of which is controlled by the control circuit 26, is switched on, the DC/DC converter 29 supplies electric power to the operation circuit 27 to permit use of the view finder 13.

The DC/DC converter 29 is connected to the switch 33 connected to the operation circuit 28 of the liquid crystal display panel 16 to turn on/off the operation circuit 28. When the switch 33, the operation of which is controlled by the control circuit 26, has been switched on, the DC/DC converter 29 supplies electric power to the operation circuit 28 to permit use of the liquid crystal display panel 16.

The DC/DC converter 29 is connected to the switch 34 connected to the infrared light 12 and arranged to control the operation of the infrared light 12. When an operation signal indicating use of the infrared light 12 has been supplied from the operation portion 31 to the control circuit 26, the DC/DC converter 29 switches the switch 34 on. Thus, the DC/DC converter 29 supplies electric power to the infrared light 12 to permit a photographing operation in a dark environment. When an operation signal indicating a fact that the infrared light 12 is not used has been supplied from the operation portion 31 to the control circuit 26, the DC/DC converter 29 switches the switch 34 off.

Figure 8:
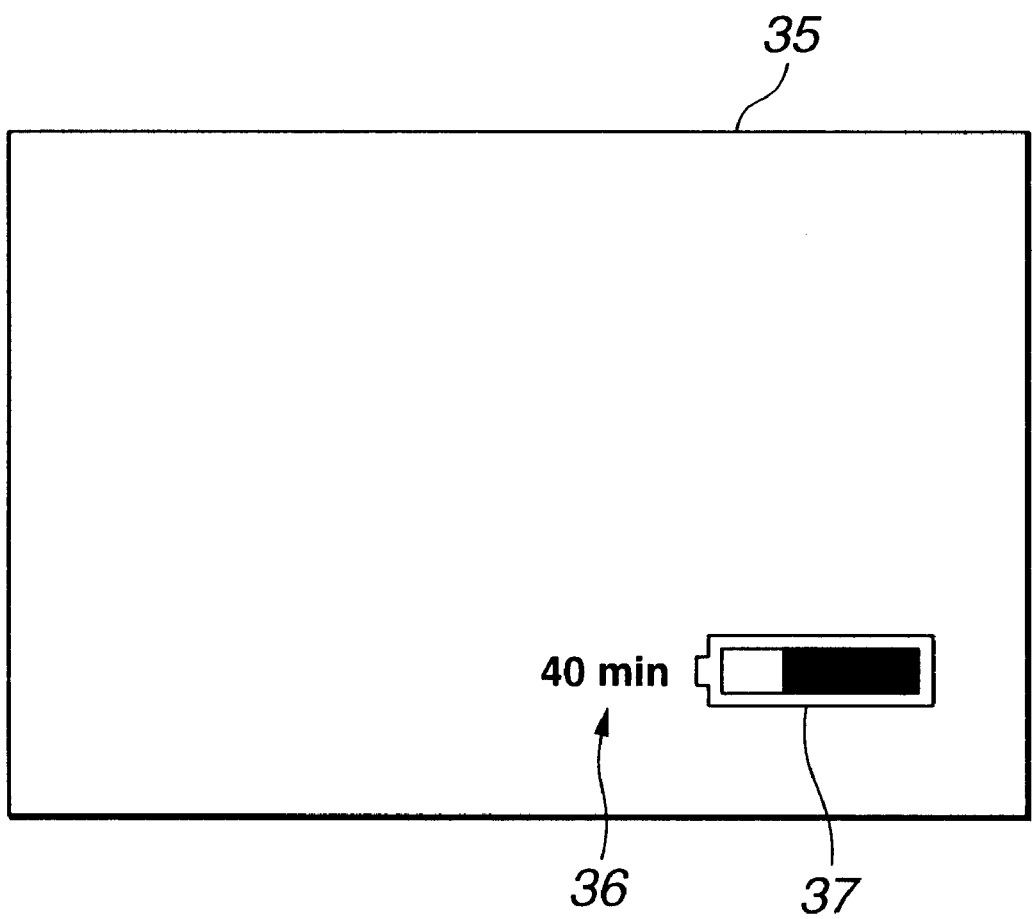
FIG. 8 is a graph showing information about the residual amount in a battery which is displayed on the view finder and the liquid crystal display panel.

As shown in FIG. 8, the view finder 13 and/or the liquid crystal display panel 16 displays the residual amount in the battery on a display screen 35 in accordance with the residual time R produced by the display control circuit 24 constituting the microcomputer 21 and indicating time to the termination of the battery, that is, information about display of the residual amount in the battery. That is, a time display portion 36 indicating residual operable time by using figures and a ratio display portion 37 indicating the ratio of the present residual amount in the battery with respect to a full-charge state of the battery pack 50 are displayed on the display screen 35. When the residual time is 40 minutes, characters "40 min" are displayed on the time display portion 36. The ratio display portion 37 is able to display four or more levels which are changed in a step-less manner to correspond to the residual amount in the battery.

Figure 9:
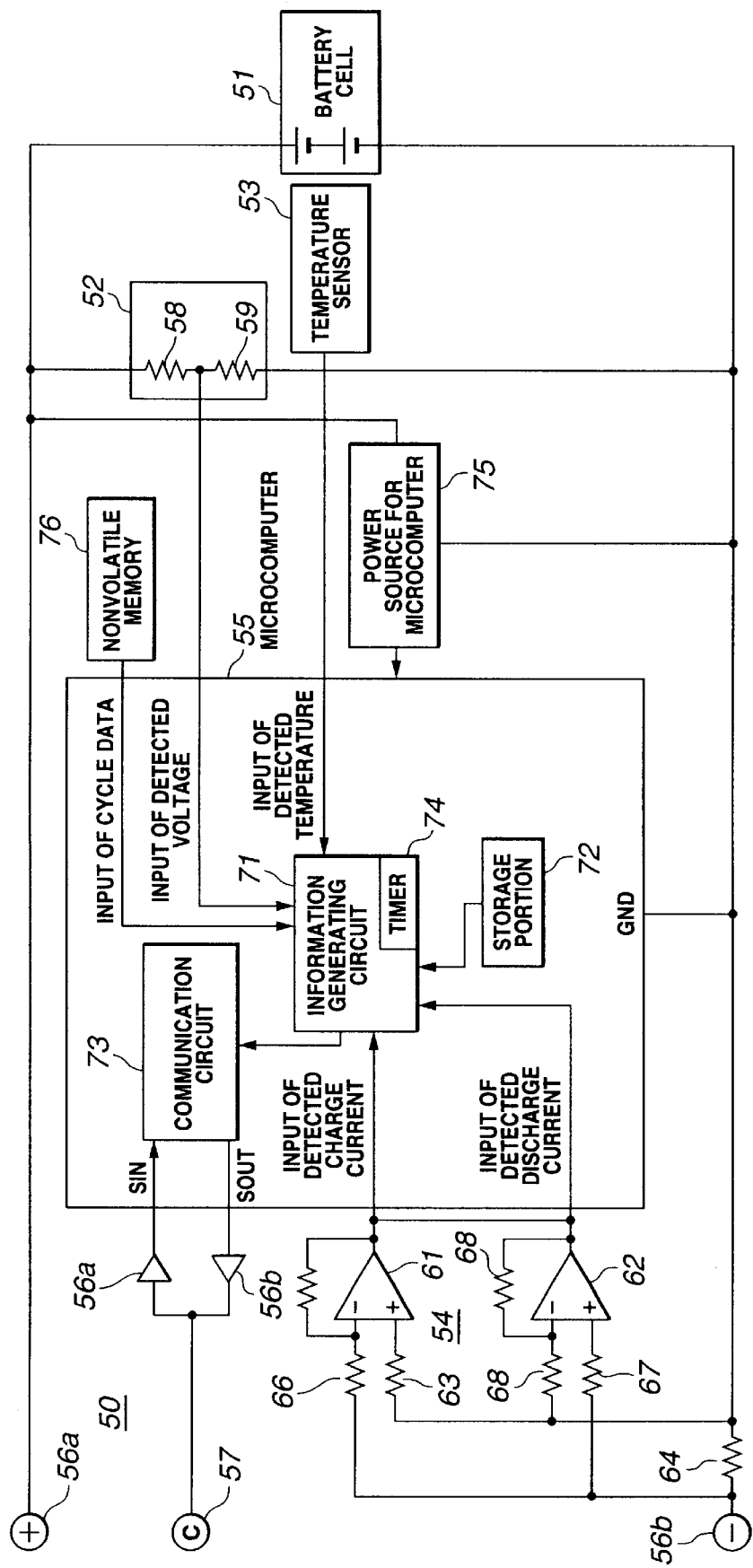
FIG. 9 is a block diagram showing a battery pack which is mounted on the body of the apparatus.

As described above, the battery pack 50 is loaded into the battery loading portion 15 of the apparatus body 10 to supply electric power to the apparatus body 10. As shown in FIGS. 1 and 9, the battery pack 50 incorporates a battery cell 51 in which a plurality of cells are connected in parallel, a temperature detection sensor 53 for detecting the temperature of the battery cell 51, a charge/discharge current detection circuit 54 for detecting charge/discharge current of the battery cell 51 and a microcomputer 55 for producing information about the battery pack 50 in response to signals supplied from the voltage detection circuit 52, the temperature detection sensor 53 and the charge/discharge current detection circuit 54.

As shown in FIG. 1, the battery pack 50 incorporates a positive terminal 56a and a negative terminal 56b provided for an engagement portion which is engaged to the battery loading portion 15 of the apparatus body 10. Thus, the engagement portion is engaged to the battery loading portion 15, the positive terminal 56a is connected to the positive battery terminal 18a provided for the battery loading portion 15 of the apparatus body 10 and the negative terminal 56b is connected to the negative battery terminal 18b provided for the battery loading portion 15. Thus, electric power is supplied from the battery pack 50 to the apparatus body 10.

The engagement portion of the battery pack 50 provided with the positive terminal 56a and the negative terminal 56b is provided with the communication terminal 57 for establishing the communication of information about the battery pack 50 with the apparatus body 10. When the engagement portion has been engaged to the battery loading portion 15, the communication terminal 57 is connected to the communication terminal 19 provided for the battery loading portion 15 of the apparatus body 10. When the battery pack 50 has been loaded into the battery loading portion 15 of the apparatus body 10, a requirement signal transmitted from the apparatus body 10 through the communication terminals 19 and 56 is amplified by a buffer amplifier 57a so as to be supplied to the microcomputer 55. Battery information about the battery pack 50 is amplified by a buffer amplifier 57b in response to the requirement signal. Then, the microcomputer 55 supplies battery information to the microcomputer 21 of the apparatus body 10 through the communication terminals 57 and 19.

The battery pack 50 accommodates plural, that is, two types of battery packs having different allowable load electric power. The battery packs have positive terminals 56a and the negative terminals 56b formed into the same shape so that connection to the positive battery terminal 18a and the negative battery terminal 18b is permitted when the types are different from each other. Moreover, the output voltage from each of the battery packs 50 having the different allowable load electric power is the same.

The battery cell 51 incorporates the plurality of cells which are connected in parallel. The battery cell 51 is a battery cell having a large number of cells connected in parallel to have large allowable load electric power. The battery cell 51 is a battery cell having a small number of cells connected in parallel to have small allowable load electric power.

As shown in FIG. 9, the voltage detection circuit 52 of the battery cell 51 for detecting the voltage between terminals of the battery cell 51 is a potential division resistor consisting of resistors 58 and 59. The potential division resistor detects the voltage between the terminals of the battery cell 51. When the voltage detection circuit 52 has detected the voltage between the terminals of the battery cell 51, the voltage detection circuit 52 supplies detected voltage to a voltage detection input terminal of the microcomputer 55.

The temperature detection sensor 53 comprises, for example, a temperature detection thermistor disposed adjacent to the battery cell 51 or in contact with the same. When the temperature detection sensor 53 has detected the temperature of the battery cell 51, the temperature detection sensor 53 supplies the detected temperature to the temperature detection input terminal of the microcomputer 55.

The charge/discharge current detection circuit 54 for detecting the charge/discharge current of the battery cell 51 incorporates an operational amplifier 61 for detecting a charge current and an operational amplifier 62 for detecting a discharged current, as shown in FIG. 9.

A non inverting input terminal of the operational amplifier 61 for detecting a charge current is connected to a negative electrode of the battery cell 51 through the resistor 63 and the resistor 64 for detecting the voltage of the electric current. An inverting input terminal of the operational amplifier 61 for detecting a charge current is connected to a negative feedback resistor 65 and a resistor 66. The output terminal of the operational amplifier 61 is connected to a charge-current detection input terminal of the microcomputer 55. Therefore, the operational amplifier 61 for detecting a charge current, from an output terminal thereof, outputs a voltage level obtained by amplifying the value of an electric current which flows in the battery pack 50 when a charging operation is performed to correspond to the ratio (the resistance of the resistor 65/the resistance of the resistor 66) of the resistors 65 and 66. A non inverting input terminal of the operational amplifier 62 for detecting a discharged current is connected to the negative electrode of the battery cell 51 through a resistor 67 and a resistor 64 for detecting the voltage of the electric current. An inverting input terminal of the operational amplifier 62 for detecting a discharged current is connected to a resistor 68 and a resistor 69. An output terminal of the operational amplifier 62 for detecting a discharged current is connected to a discharge current detection input terminal of the microcomputer 55. Therefore, the operational amplifier 62 for detecting a discharged current, from an output terminal thereof, outputs a voltage level obtained by amplifying the value of the electric current which flows in the battery pack 50 when a discharging operation is performed to correspond to the ratio (the resistance of the resistor 68/the resistance of the resistor 69).

The microcomputer 55 produces information about the battery pack 50 in response to the signals supplied from the voltage detection circuit 52, the temperature detection sensor 53 and the charge/discharge current detection circuit 54. The microcomputer 55 incorporates an information generating circuit 71 to which the signals are supplied from the voltage detection circuit 52, the temperature detection sensor 53 and the charge/discharge current detection circuit 54 and which produces information about the battery pack 50, a storage portion 72 in which the types of the battery pack 50 are stored and a communication circuit 73 for transmitting information about the battery pack 50 produced by the information generating circuit 71.

The voltage level is input to the information generating circuit 71 from the operational amplifier 61 for detecting a charge current and the operational amplifier 62 for detecting a discharged current. The information generating circuit 71 detects the voltage level realized when the charging operation is performed and input to the charge-current detection input terminal from the operational amplifier 61 for detecting a charge current and the voltage level realized when the discharging operation is performed and input to the discharge-current detection input terminal from the operational amplifier 62 for detecting a discharged current. In accordance with the voltage levels realized when the charging/discharging operation is performed and the resistance of the resistor 64, the information generating circuit 71 produces information about the charge/discharge current.

The information generating circuit 71 incorporates a timer 75 for counting charge time and discharge time. The information generating circuit 71 multiplies information about the discharge current with the discharge time counted by the timer 75 to produce residual amount of the integrated discharge currents. The information generating circuit 71 is supplied with the detected temperature supplied from the voltage detection circuit 52 to the voltage detection input terminal and supplied from the temperature detection sensor 53 to the temperature detection input terminal. The information generating circuit 71 produces the temperature dependency coefficient in accordance with the detected temperature.

The storage portion 72 has internal connection information indicating the number of the cells constituting the battery cell 51 and connected in parallel, that is, information about the allowable load electric power indicating the allowable load electric power of the battery pack 50. When the battery pack 50 has been loaded into the battery loading portion 15 of the apparatus body 10, information about the allowable load electric power is read from the information generating circuit 71.

The battery pack 50 incorporates a nonvolatile memory 76. The nonvolatile memory 76 comprises an EEP-ROM in which cycle data about the largest number of charge/discharge cycles permitted for the battery cell 51 has been stored. In accordance with cycle data about the largest number of charge/discharge cycles supplied from the nonvolatile memory 76 and the detected voltage supplied from the voltage detection circuit 52, the information generating circuit 71 measures the number of charge/discharge cycles of the battery cell 51. When the number of the charge/discharge cycles of the battery cell 51 has reached the largest number of the charge/discharge cycles, the information generating circuit 71 transmits information about the life of the battery to the microcomputer 21 of the apparatus body 10.

When the view finder 13 of the apparatus body 10 and/or the liquid crystal display panel 16 has received information about the life of the battery transmitted from the battery pack 50, display for causing the battery pack 50 to be changed by the user is performed. For example, a display such as "the battery is at the end of its life and should be changed" is disposed on the view finder 13 and/or the liquid crystal display panel 16. Thus, the photographer is able to easily recognize the end of the life of the battery pack 50.

When the battery pack 50 has been loaded into the battery loading portion 15, the communication circuit 73 transmits, to the microcomputer 21 of the apparatus body 10, battery information about the battery pack 50 supplied from the information generating circuit 71 and including the integrated value of charge/discharge currents, the detected temperature and information about the allowable load electric power.

Note that the microcomputer 55 is operated when electric power is supplied to the microcomputer 55 from a power source 75 for the microcomputer 55.

The video camera apparatus 1 structured as described above causes the view finder 13 and/or the liquid crystal display panel 16 to display the residual amount in the battery pack 50 when the battery pack 50 has been loaded into the battery loading portion 15 of the apparatus body 10 and thus the operation of the video camera apparatus 1 has been started.

Figure 10:
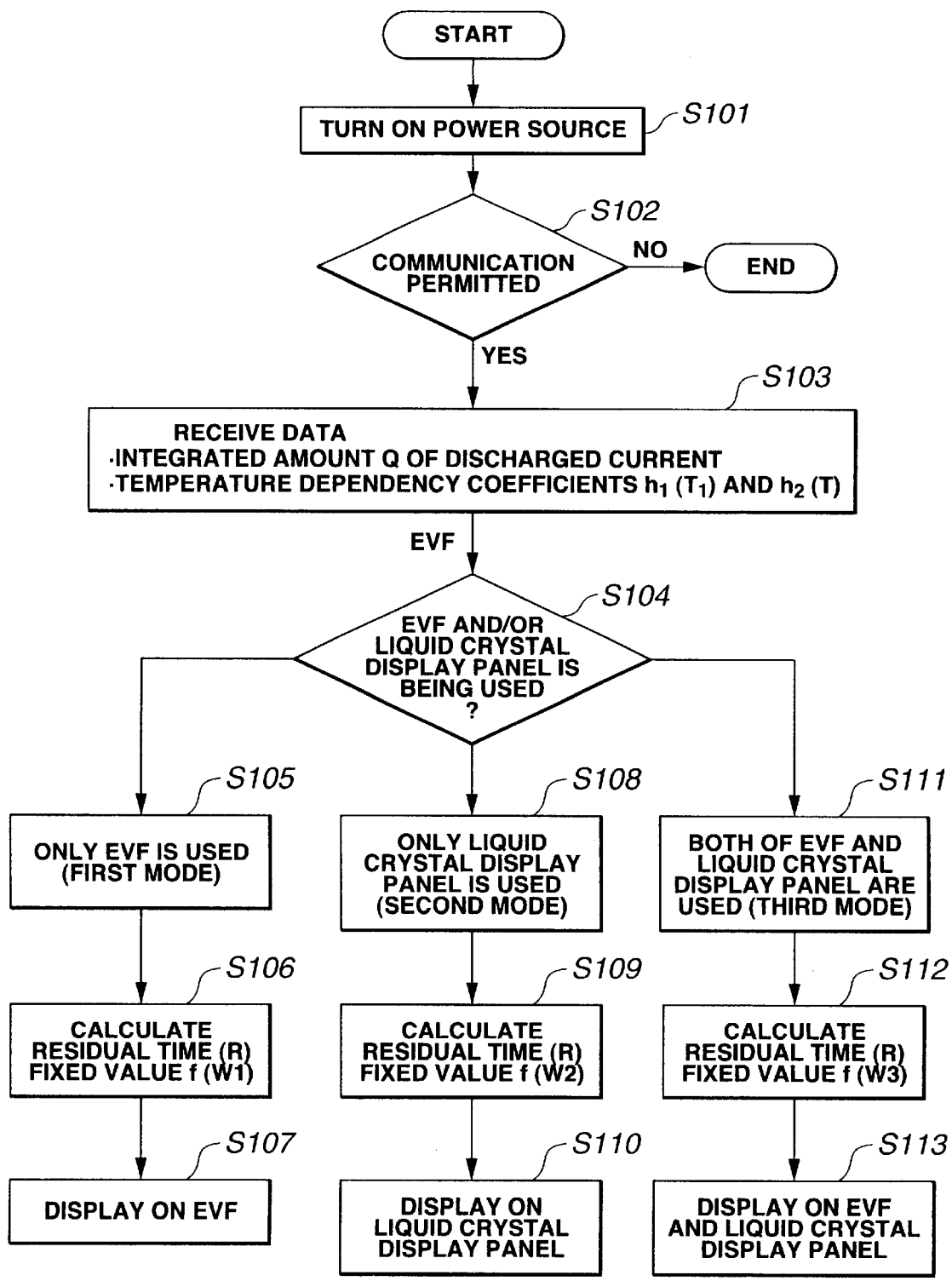
FIG. 10 is a flow chart showing a process for calculating information about the residual amount in the battery.

That is, when the power source for the apparatus body 10 has been turned on in step S101, the microcomputer 21 of the apparatus body 10 determines in step S102 whether or not the communication with the battery pack 50 can be established as shown in FIG. 10. Then, the microcomputer 21 transmits a requirement signal for requiring information about the battery pack 50 to the microcomputer 55 of the battery pack 50 through the communication terminals 19 and 57.

When the microcomputer 21 of the apparatus body 10 has received the response signal from the microcomputer 55 of the battery pack 50, the microcomputer 21 determines that the communication with the battery pack 50 can be established. Then, the operation proceeds to step S103. When no response signal has been received, the microcomputer 21 determines that the communication with the battery pack 50 cannot be established. Thus, microcomputer 21 completes the process.

In step S103, the communication circuit 22 constituting the microcomputer 21 receives the residual amount of the integrated discharge currents and temperature dependency coefficient produced by the information generating circuit 71 which constitutes the microcomputer 55 of the battery pack 50. Then, the operation proceeds to step S104.

In step S104, the control circuit 26 constituting the microcomputer 21 determines the present state which is the first mode in which only the view finder 13 is used, the second mode in which only the liquid crystal display panel 16 is used, or the third mode in which both of the view finder 13 and the liquid crystal display panel 16 are used. Specifically, the control circuit 26 determines that the present mode is the first mode when the ocular sensor 13a provided for the view finder 13 has been turned on and the opening/closing detection switch 17a provided for the hinge portion 17 of the liquid crystal display panel 16 has been turned off. The control circuit 26 determines that the present mode is the second mode when the ocular sensor 13a has been turned off and the opening/closing detection switch 17a has been turned on. The control circuit 26 determines that the present mode is the third mode when both of the ocular sensor 13a and the opening/closing detection switch 17a have been turned on.

When the control circuit 26 has determined that the present mode of the apparatus body 10 is the first mode in step S105, the control circuit 26 supplies information indicating that the present mode of the apparatus body 10 is the first mode to the calculating circuit 23. Then, in step S106 the calculating circuit 23 calculates the residual timeR to the termination of the battery in the first mode. Specifically, the calculating circuit 23, as shown in FIG. 5, uses the residual amount (Q) of the integrated discharge currents, the temperature dependency coefficients h1 (T) and h2 (T) transmitted to the communication circuit 22, the electric power dependency coefficient f (W1) and the battery termination residual amount g (W1) which have been stored to calculate the residual timeR to the termination of the battery. This is shown by the expression:

$$R = (Q - g(W1)h2(T))f(W1)h1(T)$$

In step S107, the calculating circuit 23 communicates the residual time (R) in the first mode to the display control circuit 24. In accordance with the the residual timeR to the termination of the battery in the first mode, the display control circuit 24 produces information about the residual amount of the battery which is displayed on the view finder 13. Then, the display control circuit 24 causes the view finder 13 to perform the display arranged as shown in FIG. 8.

When the control circuit 26 has determined in step S104 that the present mode is the second mode in which only the liquid crystal display panel 16 is used, the control circuit 26, in step S108, supplies, to the calculating circuit 23, information indicating the present mode of the apparatus body 10 is the second mode. In step S109, the calculating circuit 23 calculates the residual timeR to the termination of the battery in the second mode. Specifically, the calculating circuit 23, as shown in FIG. 6, uses the residual amount (Q) of the integrated discharge currents, the temperature dependency coefficients h1 (T) and h2 (T) transmitted to the communication circuit 22, the electric power dependency coefficient f (W2) and the battery termination residual amount g (W2) which have been stored to calculate time (the residual time) (R) which takes to the termination of the battery. This is shown by the expression:

$$R=(Q \div g(W2)h2(T))f(W2)h1(T)$$

In step S110, the calculating circuit 23 communicates the residual time (R) in the second mode to the display control circuit 24. In accordance with the time (the residual time) (R) which takes to the termination of the battery in the second mode, the display control circuit 24 produces information about the display of the residual amount in the battery to be displayed on the liquid crystal display panel 16. Then, the display control circuit 24 causes the liquid crystal display panel 16 to perform the display arranged as shown in FIG. 8.

When the control circuit 26 has determined in step S111 that the present mode is the third mode in which both of the view finder 13 and the liquid crystal display panel 16 are used, the control circuit 26 supplies, to the calculating circuit 23, information indicating a fact the present mode of the apparatus body 10 is the third mode. In step S112 the calculating circuit 23 calculates time (the residual time) (R) which takes to the termination of the battery in the third mode. Specifically, the calculating circuit 23, as shown in FIG. 7, uses the residual amount (Q) of the integrated discharge currents, the temperature dependency coefficients h1 (T) and h2 (T) transmitted to the communication circuit 22, the electric power dependency coefficient f (W3) and the battery termination residual amount g (W3) which have been stored to calculate time (the residual time) (R) which takes to the termination of the battery.

In step S113 the calculating circuit 23 supplies the residual time (R) in the third mode to the display control circuit 24. In accordance with the time (the residual time) (R) which takes to the termination of the battery in the third mode, the display control circuit 24 produces information about the display of the residual amount in the battery which is displayed on the view finder 13 and the liquid crystal display panel 16. Then, the calculating circuit 23 causes the view finder 13 and the liquid crystal display panel 16 to perform the display arranged as shown in FIG. 8.

As described above, the video camera apparatus 1 is operated such that the battery pack 50 is loaded into the battery loading portion 15 of the apparatus body 10. The calculating circuit 23 which constitutes the microcomputer 21 of the apparatus body 10 has the electric power dependency coefficients f (W1 to W3) and the residual amounts g (W1 to W3) at the time of the termination of the battery which are previously stored. The calculating circuit 23 uses the electric power dependency coefficients of (W1 to W3) and the residual amounts g (W1 to 3) to calculate time (the residual time) (R) which takes to the termination of the battery. Therefore, when the liquid crystal display panel 16 has been successively opened/closed by the user, dispersion of the display of the residual amount in the battery on the view finder 13 and/or the liquid crystal display panel 16 can be prevented.

As described above, the calculating circuit 23 stores first to third power consumption which is the fixed value for each of the first mode in which only the view finder 13 is used, the second mode in which only the liquid crystal display panel 16 is used and the third mode in which both of the view finder 13 and the liquid crystal display panel 16 are used. The number of the modes may be only the first and second modes which can be switched. When another display means is provided, the number of the modes may be enlarged to produce information about the residual amount in the battery in accordance with the power consumption information corresponding to each mode. When combination with another function of the apparatus body 10 is employed, information about the residual amount in the battery corresponding to the combination may be displayed.

The video camera apparatus 1 identifies information about the allowable load electric power which is determined in accordance with the type of the battery pack 50, that is, the number of the cells constituting the battery cell 51 of the battery pack 50 and connected in parallel. Thus, switching performed between a usual mode in which all of the functions provided for the apparatus body 10 can be used and a function limited mode in which the functions of the apparatus body 10 are limited.

Figure 11:
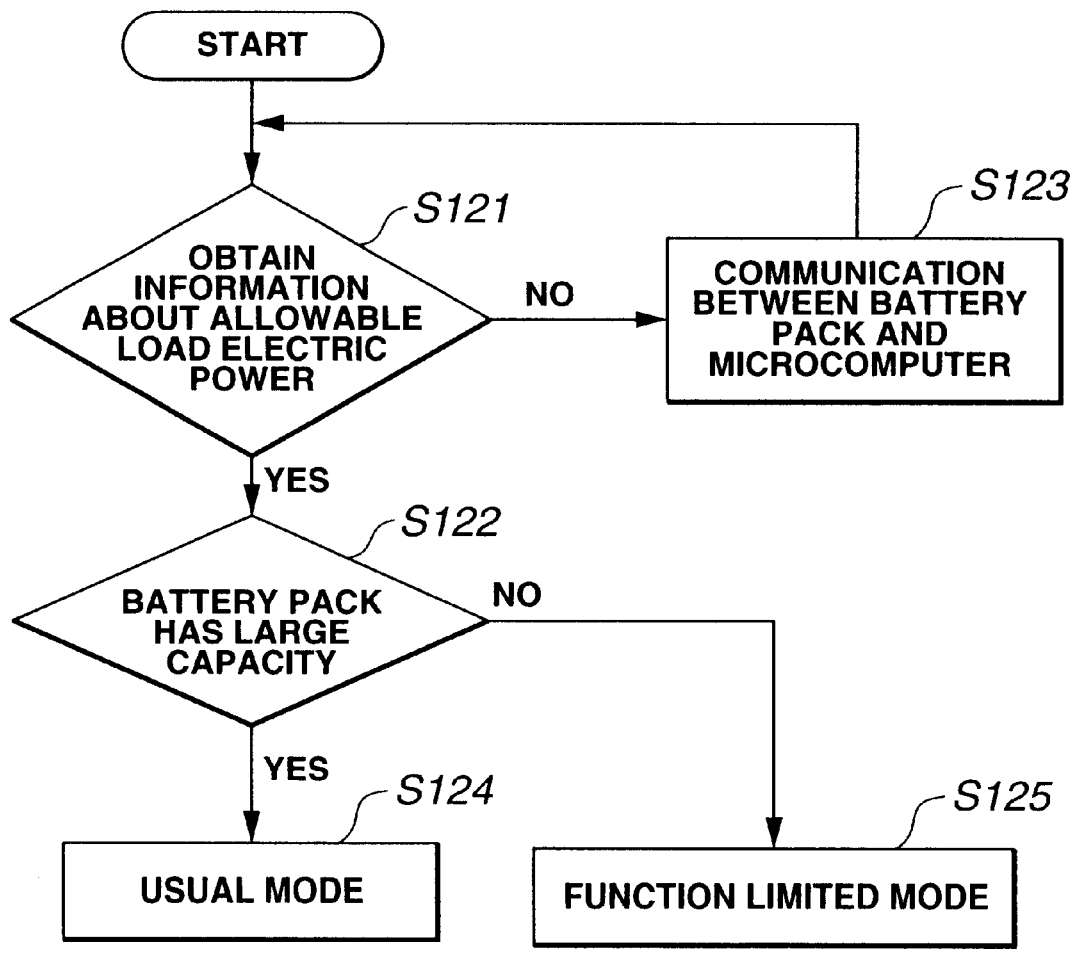
FIG. 11 is a flow chart showing a process for distinguishing between a normal mode and a function limited mode.

Specifically as shown in FIG. 11, when the battery pack 50 has been loaded into the battery loading portion 15 of the apparatus body 10, the power-source control circuit 25 constituting the microcomputer 21, in step S121, reads information about the allowable load electric power stored in the storage portion 72 constituting the microcomputer 55 of the battery pack 50 through the communication circuits 73 and 22 together with residual amount of the integrated discharge currents (Q) and temperature dependency coefficients h1 (T) and h2 (T). When the power-source control circuit 25 has received information about the allowable load electric power from the battery pack 50, the operation proceeds to step S122. When the power-source control circuit 25 has not obtained information about the allowable load electric power from the battery pack 50, the operation proceeds to step S123. Thus, communication with the microcomputer 55 of the battery pack 50 is repeated.

In step S122, the power-source control circuit 25 determines that the battery pack 50 loaded into the battery loading portion 15 of the apparatus body 10 has large allowable load electric power or small allowable load electric power in accordance with information about the allowable load electric power transmitted from the battery pack 50.

When the battery pack 50 that is loaded into the battery load in portion 15 has the large capacity, the operation of the power-source control circuit 25 proceeds to step S124. Thus, the power-source control circuit 25 selects the usual mode in which all of the functions provided for the apparatus body 10 can be used. Then, the power-source control circuit 25 reads first operation information of the usual mode from the storage portion 25a to supply first operation information to the control circuit 26.

When the battery pack 50 that is loaded into the battery loading portion 15 is not the large capacity type pack, the operation of the power-source control circuit 25 proceeds to step S125. Thus, the power-source control circuit 25 selects the function limited mode in which the functions of the apparatus body 10 are limited. Then, the power-source control circuit 25 reads second operation information of the function limited mode from the storage portion 25a to supply second operation information to the control circuit 26.

In the function limited mode, only either of the liquid crystal display panel 16 or the infrared light 12 of the apparatus body 10 can be used. In the function limited mode, both of the view finder 13 and the liquid crystal display panel 16 can substantially be used.

Figure 12:
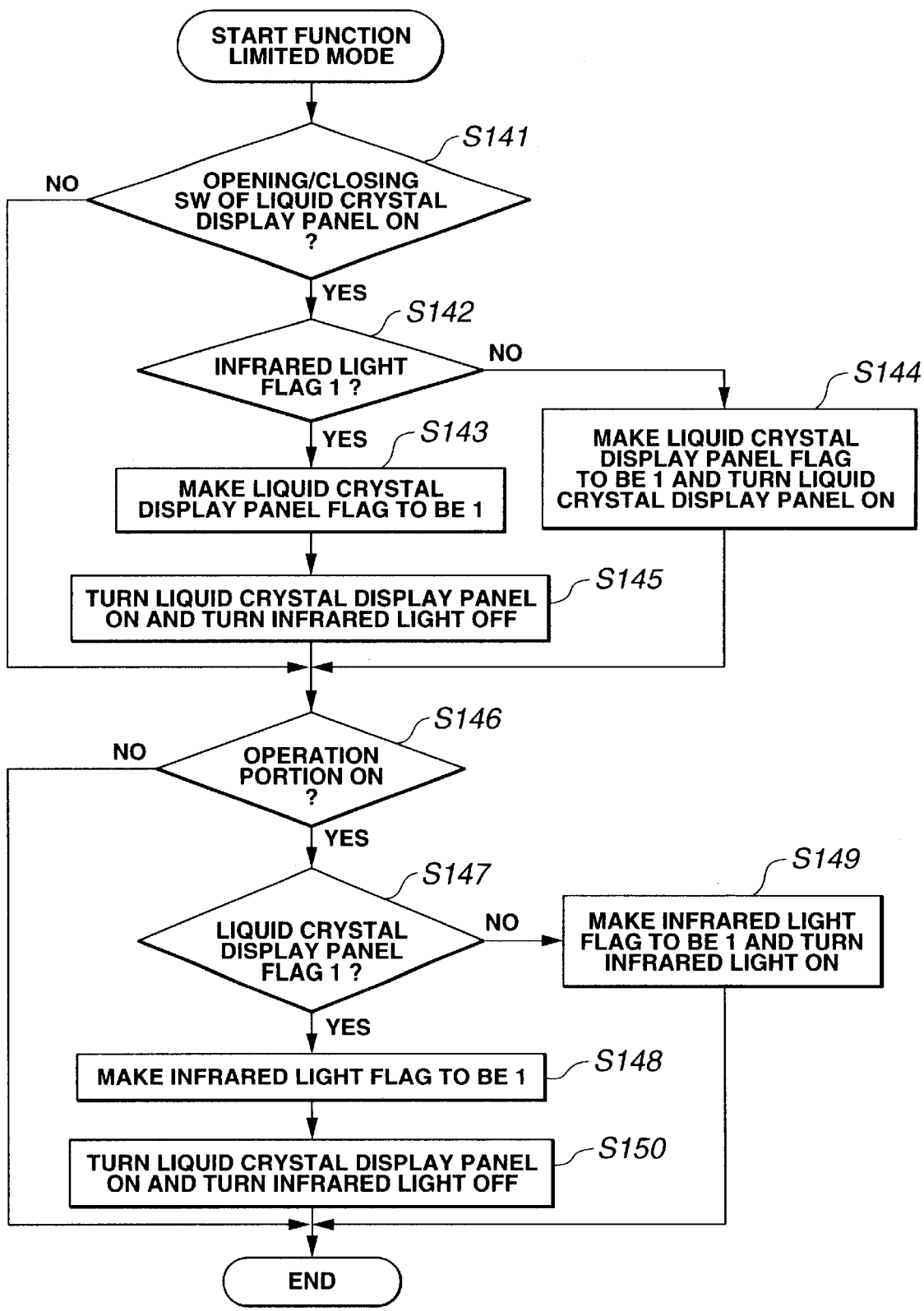
FIG. 12 is a flow chart of a process for limiting the function of the body of the apparatus in the function limited mode.

As shown in FIG. 12, the control circuit 26 for controlling the operations of the switch 34 of the infrared light 12 and the switch 33 of the liquid crystal display panel 16 determines in step S141 whether or not the opening/closing detection switch 17a for detecting opening/closing of the liquid crystal display panel 16 has been switched on, that is, in the closed state. When the opening/closing detection switch 17a has been switched on, the operation proceeds to step S142. When the opening/closing detection switch 17a has been switched off, the operation proceeds to step S146.

In step S 142, the control circuit 26 determines whether or not the infrared light flag indicating the state of the operation portion 31 of the infrared light 12 is "1" which indicates a state where the infrared light 12 is turned on. When the infrared light flag is "1", the operation of the control circuit 26 proceeds to step S143. When the infrared light flag is "0"which indicates a state where the infrared light 12 is turned off, the operation proceeds to step S144.

In step S143, the control circuit 26 makes the liquid crystal display panel flag indicating the state of the opening/closing detection switch 17a of the liquid crystal display panel 16 to be "1" which indicates a state where the opening/closing detection switch 17a is switched on. When the infrared light flag is "0" in step S142, the control circuit 26 makes liquid crystal display panel flag to be "1" in step S144 and switches the switch 33 on. Moreover, the control circuit 26 operates the liquid crystal display panel 16. Then, the operation proceeds to step S146.

When the liquid crystal display panel flag is made to be "1" in step S143, the control circuit 26 switches the switch 33 on and operates the liquid crystal display panel 16 in step S145. Moreover, the control circuit 26 switches off the switch 34 which turns on/off the infrared light 12 in a state where the infrared light flag is "1". Then, the operation proceeds to step S146.

In step S146, the control circuit 26 determines whether or not the operation portion 31 of the infrared light 12 has been turned on. When the operation portion 31 has been turned on, the operation of the control circuit 26 proceeds to step S147. When the switch 34 has been switched off, the control circuit 26 completes the process.

In step S147, the control circuit 26 determines whether or not the liquid crystal display panel flag is "1". When the liquid crystal display panel flag is "1", the operation of the control circuit 26 proceeds to step S148. When the battery cell display panel flag is "0", the operation proceeds to step S149.

In step S148, the control circuit 26 makes the infrared light flag to be "1". In step S160 the control circuit 26 switches the switch 33 on and operates the liquid crystal display panel 16. Moreover, the control circuit 26 switches off the switch 34 which turns on/off the infrared light 12 in a state where the infrared light flag is "1".

When the liquid crystal display panel flag is "0" in step S147, the control circuit 26 makes the infrared light flag to be "1" in step S149. Then, the control circuit 26 switches on the switch 34 which turns on/off the infrared light 12 to turn the infrared light 12 on.

In the function limited mode, the control circuit 26 gives priority to the operation of the liquid crystal display panel 16 as compared with the operation of the infrared light 12. When the liquid crystal display panel 16 is being operated, the control circuit 26 switches the switch 34 off in the state where the infrared light flag is "1"Thus, the switch 34 can automatically be switched on simultaneously with a moment of time at which the liquid crystal display panel 16 has been closed and the opening/closing detection switch 17a has been switched off to turn the infrared light 12 on.

As described above, when the battery pack 50 having the small allowable load electric power has been loaded, the mode of the video camera apparatus 1 is made to be the function limited mode to forcibly limit the use of the infrared light 12. Therefore, exertion of an excessively heavy load on the battery pack 50 having the small allowable load electric power can be prevented. The video camera apparatus 1 is free from any necessity for designing the functions of the apparatus body 10 corresponding to the battery pack 50 having the small allowable load electric power. Therefore, the degree of freedom of the design of the functions can be widened. Since the video camera apparatus 1 is able to use plural types of the battery pack 50, the convenience can be improved.

The operation for selectively limiting the functions between the liquid crystal display panel 16 and the infrared light 12 in the function limited mode has been described. The function which is limited is not limited to the foregoing function. The number of the types of the battery pack 50 which is loaded into the apparatus body 10, that is, the types of the battery packs having the different allowable load electric power is not limited to the two types. The number of the types may be increased.

The video camera apparatus 1 according to the present invention has been described with reference to the drawings. The present invention is not limited to the foregoing video camera apparatus 1. For example, the present invention may be applied to electronic units, such as portable telephones and portable information terminal unit.

The portable electronic apparatus according to the present invention is structured such that the output voltage is the same and the shapes of the output terminals are the same. Therefore, plural types of batteries having different electric power characteristics may be employed.

The portable electronic apparatus according to the present invention has the structure that the control means reads information about the electric power characteristics from the control means of the battery so as to identify the type of the loaded battery. Thus, the operation of the apparatus body can automatically be limited. Therefore, when the battery having the small allowable load electric power has been loaded, the operation of the apparatus body is limited to prevent exertion of an excessively heavy load on the battery having the small allowable load electric power.

Since the portable electronic apparatus according to the present invention has the structure that the operation is limited in accordance with the type of the loaded battery, the design of the apparatus body is not required to correspond to the battery having the smallest allowable load electric power. Since batteries having different electric power characteristics can be loaded into the portable electronic apparatus according to the present invention, the convenience can be improved.

What is claimed is:

1. A control unit of a portable electronic apparatus comprising:

a secondary battery cell or a battery;

control means in which information about the electric power characteristics of said secondary battery or said battery has been stored;

loading means into which plural types of batteries which produce the same output voltage and incorporating output terminals having the same shape are loaded;

communication means for receiving information about the electric power characteristics from said battery; and control means incorporating a storage portion in which information about a plurality of operations corresponding to information about the electric power characteristics is stored and arranged to read information about the operation from said storage portion in accordance with information about the electric power characteristics communicated from said control means of said battery pack so as to control apparatus operations.

2. A control unit of a portable electronic apparatus according to claim 1, wherein said control means obtains information about the internal connection of said secondary battery cell or said battery in accordance with information about the electric power characteristics to control apparatus operations.

3. A control unit of a portable electronic apparatus according to claim 2, wherein said control identifies the number of said secondary battery cells or said batteries and connected in parallel in accordance with information about the electric power characteristics to control the functions of said apparatus in accordance with a result of identification.

4. A video camera apparatus incorporating an image pickup device for converting light from a subject into an image signal and a display portion for displaying the image signal, said video camera apparatus comprising:
   a secondary battery cell or a battery;
   control means in which information about the electric power characteristics of said secondary battery or said battery has been stored;
   loading means into which plural types of batteries which produce the same output voltage and incorporating output terminals having the same shape are loaded;
   communication means for receiving information about the electric power characteristics from said battery; and
   control means incorporating a storage portion in which information about a plurality of operations corresponding to information about the electric power characteristics are stored and arranged to read information about the operation from said storage portion in accordance with information about the electric power characteristics communicated from said control means of said battery pack so as to control apparatus operations.

5. A video camera apparatus according to claim 4, wherein said control means obtains information about the internal connection of said secondary battery cell or said battery in accordance with information about the electric power characteristics to control a display state of said display portion in accordance with information about the internal connection.

6. A video camera apparatus according to claim 5, wherein said display means incorporates a first display portion and a second display portion, and said control means obtains information about the internal connection of said secondary battery cell or said battery in accordance with information about the electric power characteristics to control a state in which said display portion performs display in accordance with information about the internal connection.

7. A video camera apparatus according to claim 6, wherein said control means obtains information about the internal connection of said secondary battery cell or said battery in accordance with information about the electric power characteristics to control a state of display of said first display portion when information about the internal connection is first information and control the state of said second display portion to perform display when information about the internal connection is second information.

8. A method of controlling a video camera apparatus which incorporates an image pickup device for converting light from a subject into an image signal and a display portion for displaying the image signal, said method of controlling a video camera apparatus comprising the steps of:
   storing and controlling information about the electric power characteristics of a secondary battery cell or a battery;
   loading plural types of batteries which produce the same output voltage and which incorporate output terminals having the same shape and receiving information about electric power characteristics from said battery; and
   reading information about the operation from a storage portion in which information about a plurality of the operations corresponding to information about the electric power characteristics is stored in accordance with information about the electric power characteristics supplied from said control means of said battery pack to control apparatus operations.

9. A method of controlling a video camera apparatus according to claim 8, wherein said control step is a step in which information about the internal connection of said secondary battery cell or said battery is obtained in accordance with information about the electric power characteristics to control a display state of said display portion.

10. A method of controlling a video camera apparatus according to claim 9, wherein said display means includes a first display portion and a second display portion, and said control step is a step in which information about the internal connection of said secondary battery cell or said battery is obtained in accordance with information about the electric power characteristics to control the display state of said display portion.

11. A method of controlling a video camera apparatus according to claim 10, wherein said control step is a step in which information about the internal connection of said secondary battery cell or said battery is obtained in accordance with information about the electric power characteristics to control a state of display of said first display portion when information about the internal connection is first information and control the state of said second display portion to perform display when information about the internal connection is second information.

* * * * *